(12) United States Patent
Huang et al.

(10) Patent No.: US 9,959,466 B2
(45) Date of Patent: May 1, 2018

(54) OBJECT TRACKING APPARATUS AND METHOD AND CAMERA

(71) Applicant: Sony Corporation, Minato-ku (JP)

(72) Inventors: Huakun Huang, Beijing (CN); Kaname Ogawa, Beijing (CN)

(73) Assignee: SONY CORPORATION, Tokyo (JP)

(*) Notice: Subject to any disclaimer, the term of this patent is extended or adjusted under 35 U.S.C. 154(b) by 680 days.

(21) Appl. No.: 13/953,132

(22) Filed: Jul. 29, 2013

(65) Prior Publication Data
US 2014/0064558 A1 Mar. 6, 2014

(30) Foreign Application Priority Data
Sep. 6, 2012 (CN) .......................... 2012 1 0327851

(51) Int. Cl.
G06K 9/00 (2006.01)
G06T 7/246 (2017.01)

(52) U.S. Cl.
CPC .......... *G06K 9/00536* (2013.01); *G06T 7/248* (2017.01); *G06T 2207/10016* (2013.01); *G06T 2207/10024* (2013.01)

(58) Field of Classification Search
CPC ...... G06K 9/00536; G06T 2207/10016; G06T 7/204
See application file for complete search history.

(56) References Cited

U.S. PATENT DOCUMENTS

| | | | | |
|---|---|---|---|---|
| 5,764,786 A | * | 6/1998 | Kuwashima | G01B 11/00 348/E5.042 |
| 6,590,999 B1 | * | 7/2003 | Comaniciu | G06K 9/32 348/416.1 |
| 9,076,065 B1 | * | 7/2015 | Vijayanarasimhan | G06K 9/6256 |
| 2005/0131646 A1 | * | 6/2005 | Camus | B60R 21/013 701/301 |
| 2006/0165258 A1 | * | 7/2006 | Avidan | G06K 9/32 382/103 |
| 2006/0262960 A1 | * | 11/2006 | Le Clerc | G06K 9/32 382/103 |
| 2006/0291696 A1 | * | 12/2006 | Shao | G06K 9/3216 382/103 |
| 2009/0010493 A1 | * | 1/2009 | Gornick | G06K 9/00771 382/103 |
| 2009/0226044 A1 | * | 9/2009 | Ngan | G06K 9/00234 382/115 |

(Continued)

OTHER PUBLICATIONS

Shai Avidan, "Ensemble Tracking" IEEE Transactions on Pattern Analysis and Machine Intelligence, vol. 29, No. 2, Feb. 2007, p. 261-271.*

(Continued)

*Primary Examiner* — Gandhi Thirugnanam
(74) *Attorney, Agent, or Firm* — Oblon, McClelland, Maier & Neustadt, L.L.P.

(57) ABSTRACT

An object tracking apparatus is configured to determine, according to a predetermined object region containing an object in an initial image of an image sequence, an object region estimated to contain the object in each subsequent image of the image sequence. Moreover, the object tracking apparatus is allowed to adapt the size of the object region obtained through tracking to the change in the shape or size of the object, and to avoid a tracking error.

16 Claims, 7 Drawing Sheets

(56) References Cited

U.S. PATENT DOCUMENTS

| | | | | |
|---|---|---|---|---|
| 2010/0027842 A1* | 2/2010 | Guo | ................... | G06K 9/00624 |
| | | | | 382/103 |
| 2011/0293141 A1* | 12/2011 | Robert | ............... | G06K 9/00785 |
| | | | | 382/103 |
| 2012/0093364 A1* | 4/2012 | Sato | ........................ | G06T 7/208 |
| | | | | 382/103 |
| 2012/0148162 A1* | 6/2012 | Zhang | ................... | G06T 7/0081 |
| | | | | 382/195 |
| 2012/0321128 A1* | 12/2012 | Medioni | ............ | G06K 9/00771 |
| | | | | 382/103 |
| 2013/0176430 A1* | 7/2013 | Zhu | ....................... | G06T 7/2053 |
| | | | | 348/143 |
| 2013/0188871 A1* | 7/2013 | Huang | ................. | G06K 9/4671 |
| | | | | 382/173 |
| 2014/0064558 A1* | 3/2014 | Huang | ................... | G06T 7/204 |
| | | | | 382/103 |
| 2014/0348383 A1* | 11/2014 | Kamiya | ............. | G06K 9/00362 |
| | | | | 382/103 |
| 2014/0355821 A1* | 12/2014 | Solem | ................... | G06T 7/0046 |
| | | | | 382/103 |
| 2015/0055829 A1* | 2/2015 | Liang | ...................... | G06T 7/204 |
| | | | | 382/103 |

OTHER PUBLICATIONS

Chinese Office Acton dated Nov. 25, 2015 in Chinese Patent Application No. 201210327851.8.
Ai-Bin Chen, et al.; "a tracking method based on weighted object and background"; Control and Decision, vol. 25 No. 8, Aug. 2010.

* cited by examiner

OBJECT TRACKING APPARATUS AND METHOD AND CAMERA

FIELD OF THE INVENTION

The present invention relates to the field of computer vision, and particularly to an object tracking apparatus and method and a camera.

BACKGROUND OF THE INVENTION

Object tracking is an important issue in the field of computer vision, and has wide application scenarios. Through object tracking, a specified object can be tracked in a dynamic or static image sequence such as video images, and the position of the object in each frame or each image in the image sequence can be output. Generally, an object region of rectangle shape or another shape, for example, is used to indicate the position of the object.

In popular object tracking techniques, the size of the output object region is fixed, without changing along with the change in the shape or size of the object. In a few advanced object tracking techniques, the size of the output object region can change, but the shape thereof does not change (that is, the aspect ratio does not change). A very few advanced object tracking techniques relate to a object region of which the shape or the size changes arbitrarily.

SUMMARY OF THE INVENTION

A brief summary of the present invention is given below, so as to provide a basic understanding regarding some aspects of the present invention. It should be understood that the summary is not an exhausting overview regarding the present invention. It does not intend to establish the key or critical part of the present invention, nor intend to define the scope of the present invention. It simply aims to give some concepts in a simplified form and take them as a preface for a more detailed description to be provided later.

An object of the present invention is to provide an object tracking apparatus and method and a camera, which can track very well an object of which a shape or size changes.

According to one aspect of the present invention, there is provided an object tracking apparatus for determining, according to a predetermined object region containing an object in an initial image of an image sequence, an object region estimated to contain the object in each subsequent image of the image sequence, comprising: a first tracking unit configured to determine a first candidate object region in each subsequent image, a size of the first candidate object region being fixed for each subsequent image; a second tracking unit configured to determine a second candidate object region in each subsequent image based on the first candidate object region of the subsequent image, for each subsequent image the second candidate object region being adapted to a shape or size of the object in the subsequent image; and a weighting unit configured to calculate a weighted sum of the first candidate object region and the second candidate object region of each subsequent image as the object region of the subsequent image.

According to another aspect of the present invention, there is provided an object tracking method for determining, according to a predetermined object region containing an object in an initial image of an image sequence, an object region estimated to contain the object in each subsequent image of the image sequence, comprising: determining a first candidate object region in each subsequent image, a size of the first candidate object region being fixed for each subsequent image; determining a second candidate object region in each subsequent image based on the first candidate object region of the subsequent image, for each subsequent image the second candidate object region being adapted to a shape or size of the object in the subsequent image; and calculating a weighted sum of the first candidate object region and the second candidate object region of each subsequent image as the object region of the subsequent image.

According to yet another aspect of the present invention, there is provided a camera comprising: an image acquiring unit configured to acquire an image sequence and determine a object region containing an object in an initial image of the image sequence; and an object tracking unit configured to determine an object region estimated to contain the object in subsequent images of the image sequence according to the object region of the initial image, wherein the object tracking unit comprises: a first tracking unit configured to determine a first candidate object region in each subsequent image, a size of the first candidate object region being fixed for each subsequent image; a second tracking unit configured to determine a second candidate object region in each subsequent image based on the first candidate object region of the subsequent image, for each subsequent image the second candidate object region being adapted to a shape or size of the object in the subsequent image; and a weighting unit configured to calculate a weighted sum of the first candidate object region and the second candidate object region of each subsequent image as the object region of the subsequent image.

According to yet a further aspect of the present invention, there is provided a storage medium comprising machine readable program codes which when being executed on an information processing machine, allow the information processing machine to determine, according to a predetermined object region containing an object in an initial image of an image sequence, an object region estimated to contain the object in each subsequent image of the image sequence, by the steps of: determining a first candidate object region in each subsequent image, a size of the first candidate object region being fixed for each subsequent image; determining a second candidate object region in each subsequent image based on the first candidate object region of the subsequent image, for each subsequent image the second candidate object region being adapted to a shape or size of the object in the subsequent image; and calculating a weighted sum of the first candidate object region and the second candidate object region of each subsequent image as the object region of the subsequent image.

According to the object tracking apparatus and method and the camera of the above aspects of the present invention, an object region in each image can be obtained by determining a first candidate object region whose size is fixed in the image and a second candidate object region adapted to the shape or size of the object in the image, and calculating a weighted sum of the two candidate object regions. Thus, it can be allowed that the size of the object region obtained through tracking is adapted to the change in the shape or size of the object, and a big tracking error or even a risk of losing the object possibly caused in the case of solely using the second candidate object region adapted to the shape or size of the object in the image can be avoided.

BRIEF DESCRIPTIONS OF THE DRAWINGS

The present invention will be well understood through descriptions given hereinafter in conjunction with the accompanying drawings. Throughout the drawings, the same or similar reference signs indicate the same or similar components. The drawings, together with the following detailed descriptions, are contained in the specification to form a part of the specification and to be used to further illustrate the preferred embodiments of the present invention and to interpret the principle and advantages of the present invention. In the drawings.

DETAILED DESCRIPTIONS OF THE EMBODIMENTS

Figure 1:
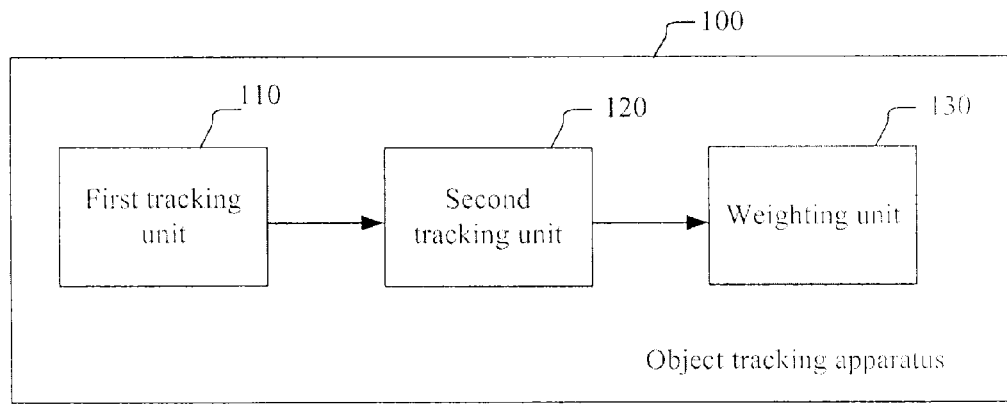
FIG. 1 shows a schematic block diagram of an object tracking apparatus according to an embodiment of the present invention.

Embodiments of the present invention will be described below with reference to the accompanying drawings. The elements and features described in a figure or an embodiment of the present invention can be combined with the elements and features shown in one or more other figures or embodiments. It should be noted that, for the purpose of clarity, representations and descriptions of elements and processes which are known to those skilled in the art or are not related to the present invention, are omitted in the drawings and the description.

FIG. 1 shows a schematic block diagram of an object tracking apparatus according to an embodiment of the present invention. An object tracking apparatus 100 therein is configured to determine, according to a predetermined object region containing an object in an initial image or an image sequence, an object region estimated to contain the object in each subsequent image of the image sequence. As shown in FIG. 1, the object tracking apparatus 100 includes a first tracking unit 110, a second tracking unit 120 and a weighting unit 130. An exemplary work flow or the object tracking apparatus 100 will be described below in conjunction with FIG. 2.

Figure 2:
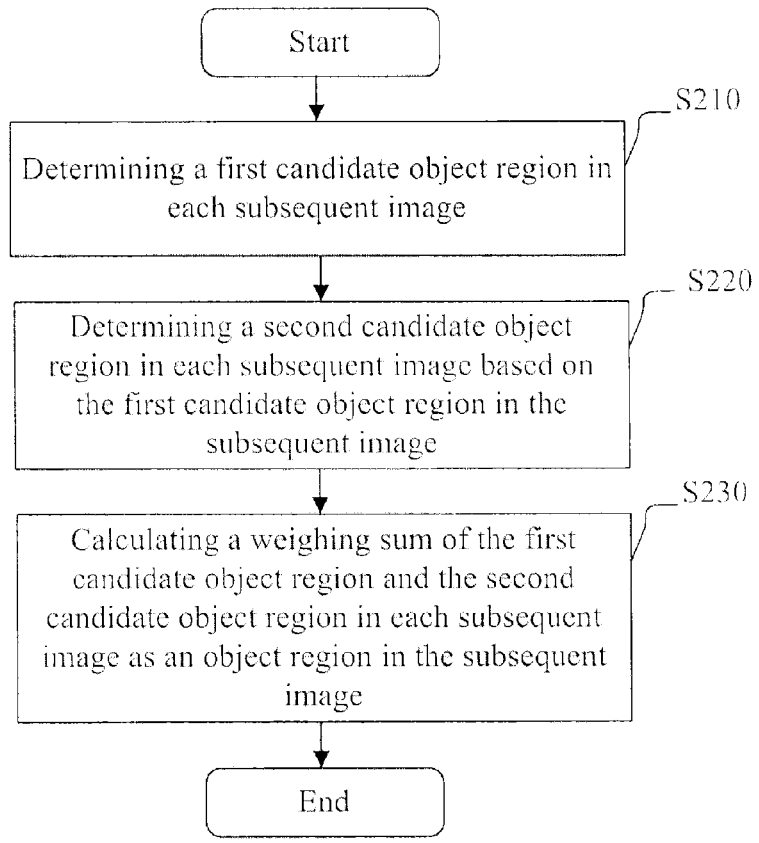
FIG. 2 shows a schematic work flowchart of the object tracking apparatus shown in FIG. 1.

FIG. 2 shows a schematic work flowchart of the object tracking apparatus shown in FIG. 1, i.e., an object tracking method according to an embodiment of the present invention. As shown in FIG. 2, in step S210, a first candidate object region in each subsequent image is determined. That is, a first object tracking method is used to track the object in the image sequence, and the output object region of each subsequent image is taken as the first candidate object region or the subsequent image. For each subsequent image, a size of the first candidate object region is fixed. In step S220, a second candidate object region in each subsequent image is determined based on the first candidate object region in the subsequent image. That is, a second object tracking method is used to track the object in the image sequence, and the output object region of each subsequent image is taken as the second candidate object region of the subsequent image. For each subsequent image, the second candidate object region is adapted to a shape or size of the object in the subsequent image. In step S230, a weighted sum of the first candidate object region and the second candidate object region of each subsequent image is calculated as the object region of the subsequent image. Herein, step S210 can be executed by the first tracking unit 110, step S220 can be executed by the second tracking unit 120, and step S230 can be executed by the weighting unit 130.

It should be understood that, the first tracking unit 110 and the second tracking unit 120 can determine the first candidate object region and the second candidate object region in each subsequent image by using any suitable object tracking method known, respectively. For example, the first racking unit 110 can determine the first candidate object region in each subsequent a by using a mean shift algorithm, and/or the second tracking unit 120 can determine the second candidate object region in each subsequent image by using a fitting method or a connected-domain analysis method. As an example but not a limitation, an embodiment that the first and second tracking units respectively determine the first and second candidate object regions based on the confidence map of the image is described in the following.

Figure 3:
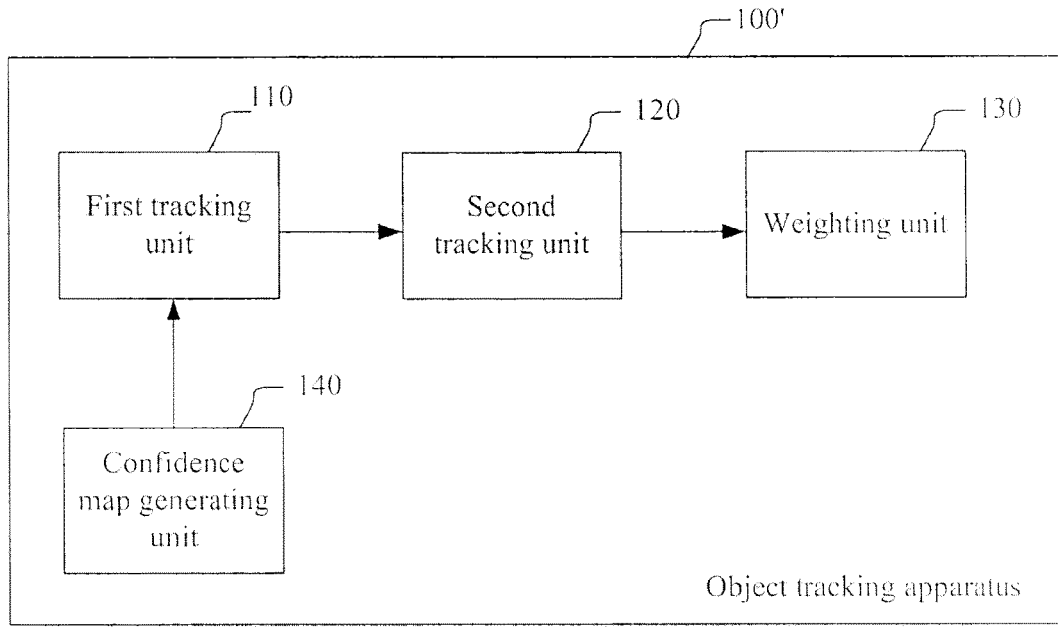
FIG. 3 shows a schematic block diagram of an object tracking apparatus according to another embodiment of the present invention.

As shown in FIG. 3, as a particular implementation, an object tracking apparatus 100' includes the first tracking unit 110, the second tracking unit 120, the weighting unit 130 and a confidence map generating unit 140. Herein, the confidence map generating unit 140 is configured to generate a confidence map for each subsequent image according to the object region of the previous image of each subsequent image in the image sequence. The value of each pixel in the confidence map of each subsequent image indicates a confidence with which a pixel in the subsequent image with the same position as the pixel in the confidence map belongs to the object. The first tracking unit 110 determines the first candidate object region of each subsequent image in the confidence map of the subsequent image. The second tracking unit 120 determines the second candidate object region of each subsequent image in the confidence map of the subsequent image, based on the first candidate object region of the subsequent image. The weighting unit 130 functions the same as that shown in FIG. 1.

It should be understood that the confidence map of the subsequent image can be generated by using various features of the subsequent image in the embodiment of the present invention. For example, the confidence map can be generated by using a color feature, a texture feature or the combination thereof of the subsequent image, without limitation. For the purpose of illustration, there is provided below an example that the confidence map is generated by using a color feature of the subsequent image.

In an example, the confidence map of each subsequent image is a color confidence map of the subsequent image, that is, the confidence map is generated by using a color feature. In the color confidence map, the value of each pixel is a ratio of the distribution probability of a color at the position of this pixel in the subsequent image in the object region of the subsequent image to the distribution probability of the color in the subsequent image. This can be indicated by the following formula 1:

$$p(obj \mid c_i) = \frac{p(c_i, obj)}{p(c_i)} \qquad \text{(formula 1)}$$

In the above formula, $c_i$ indicates a color whose value is i, and the range of the values of i depends on the size of the color space of the subsequent image. For example, in a grayscale image, the range of the values of i is [0, 255], and in an RGB image, the range of the values of i is [0, 255×255×255]. $p(c_i,obj)$ indicates the distribution probability of the color $c_i$ in the object region, $p(c_i)$ indicates the distribution probability of the color $c_i$ in the whole subsequent image, and $p(obj|c_i)$ indicates the ratio of the above mentioned two distribution probabilities and serves as the pixel value of a pixel having the color $c_i$ in the confidence map.

The higher the above mentioned ratio of distribution probabilities is, the higher the possibility that the pixel having the color belongs to the object is.

Since the object region of the subsequent image has not been determined at this time, the object region of the previous image of the subsequent image in the image sequence can be taken as the object region of the subsequent image.

In a variation of the above example, the value of each pixel is a ratio of the distribution probability of a color at the position of this pixel in the subsequent image in the object region of the subsequent image to the distribution probability of the color in an region of a predetermined size containing the object region in the subsequent image. That is, in the variation, $p(c_i)$ in the above mentioned formula 1 becomes the distribution probability of the color $c_i$ in a region or a predetermined size in the subsequent image.

In a variation of the above example, a confidence map is generated by using color bins, so as to save calculation resources. Specifically, the value of each pixel in the color confidence map of the subsequent image is a ratio of the distribution probability of a color bin that the color at the position of this pixel in the subsequent image belongs to in the object region of the subsequent image to the distribution probability of the color bin that the color belongs to in the subsequent image. In this case, $c_i$ in the above mentioned formula 1 can indicates color bin i. The width of each color bin can be set according to actual needs. As an implementation, a color histogram of each subsequent image can be generated, and the color bins in the color histogram can be used as the color bins used in the above distribution probability calculation.

In another variation of the above example, confidence map generating unit 140 further extracts the pixels in each subsequent image of which the ratios of the distribution probabilities of the colors are higher than a first predetermined threshold to form the color confidence map of the subsequent image. That is, in the confidence map, the value at the position of a pixel, of which the ratio of the distribution probabilities of the color in the subsequent image is equal to or lower than the first predetermined threshold, will be set as zero. The higher the above ratio of the distribution probabilities is, the higher the possibility with which the pixel having the color belongs to the object is; otherwise, the lower the possibility with which the pixel having the color belongs to the object is, and the higher the possibility with which the pixel belongs to the background is. By using the pixels with high possibilities of belonging to the object to form a confidence map while removing the pixels with high possibilities of belonging to the background, the interference of the background to the subsequent processes can be mitigated to some extent.

In another example of generating a confidence map by using a color feature, the value of each pixel in the confidence map can be the sum of the absolute values of the differences between the color value at the position of the pixel in the corresponding subsequent image and the color values of the individual pixels outside the object region of the subsequent image. The lower the sum is, the closer the color of the pixel is to the colors of the background, and the higher the possibility with which the pixel belongs to the background is. The higher the sum is, the larger the difference between the color of the pixel and the background is, and the higher the possibility with which the pixel belongs to the object is. In this example, likewise, the object region of the previous image of the subsequent image in the image sequence can be taken as the object region of the subsequent image.

In the above example, the confidence map is generated by using a color feature. Since the value of a pixel in the subsequent image represents the color value, the process of calculating a feature value according to the pixel value is avoided, increasing the calculation efficiency.

Regarding an example of generating a confidence map by using other features such as a texture feature or by using the combination of the color and the texture features, the implementation principle is identical to the principle of generating a color confidence map. For example, the value of each pixel in the confidence map of the subsequent image is the ratio of the distribution probability of the value of the feature (in short, feature value) at the position of the pixel in the subsequent image, in the feature values of the pixels in the object region of the subsequent image, to the distribution probability of the feature value in the feature values of all the pixels of the subsequent image. Likewise, the object region of the previous image of the subsequent image in the image sequence can be taken as the object region of the subsequent image. More details will not be enumerated here again.

Figure 4:
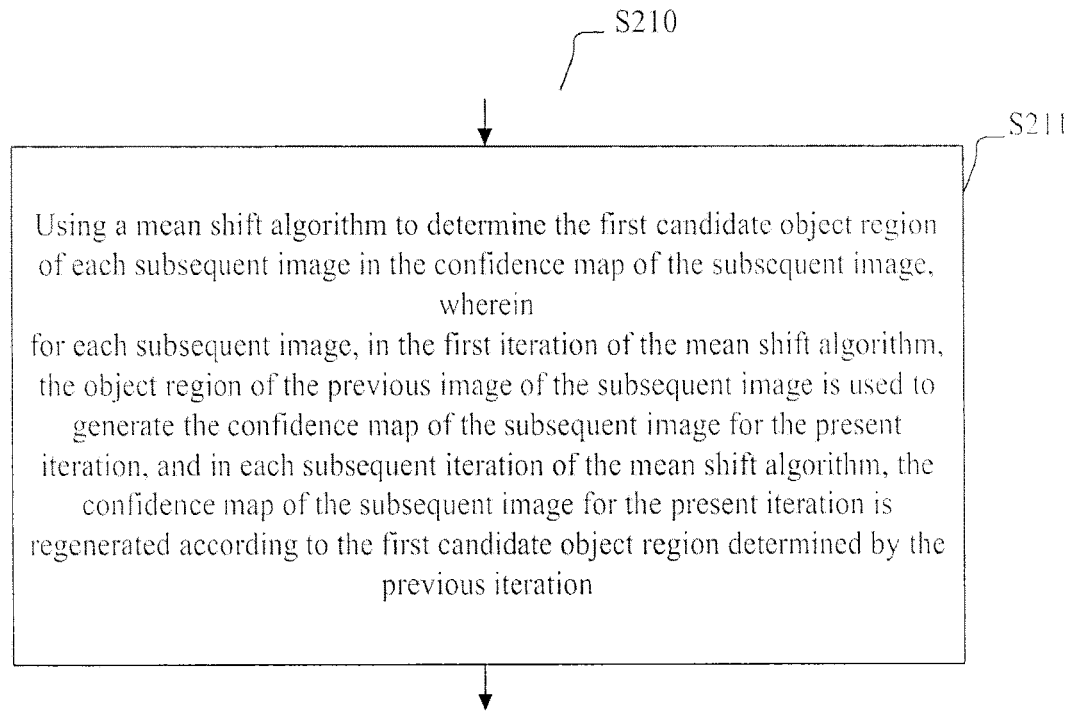
FIG. 4 shows a schematic work flowchart of a first tracking unit according to an embodiment of the present invention.

As an example but not a limitation, in an embodiment according to the present invention, the first tracking unit 110 can determine the first candidate object region of each subsequent image in the confidence map of the subsequent image by using a mean shift algorithm. FIG. 4 shows a schematic work flowchart of the first tracking unit 110 according to the embodiment. The work flow in FIG. 4 is also a specific implementation of step S210 in FIG. 2.

Conventionally, each iteration of the mean shift algorithm is executed on the same confidence map. In order to increase the efficiency of object tracking, in an embodiment of the present invention, in each iteration of the mean shift algorithm, the confidence map of the subsequent image is updated by using the result of the previous iteration, and the mean shift is executed on the updated confidence map. Specifically, for each subsequent image, in the first iteration of the mean shift algorithm, the confidence map generating unit 120 uses the object region of the previous image of the subsequent image to generate the confidence map of the subsequent image for the present iteration, and in each subsequent iteration of the mean shift algorithm, the confidence map generating unit 120 regenerates the confidence map of the subsequent image for the present iteration according to the first candidate object region determined by the previous iteration.

For each subsequent image, in each iteration of the mean shift algorithm, the first tracking unit 110 calculates the barycenter of the values of the pixels which are in the confidence map for the present iteration and are located in the first candidate object region determined by the previous iteration, and updates the location of the first candidate object region such that the center of the updated first candidate object region coincides with the barycenter. When the iterations of the mean shift algorithm stops upon meeting a condition, the first candidate object region obtained by the last iteration is taken as the final first candidate object region of the subsequent image.

Regarding more details of the mean shift algorithm itself, reference can be made to conventional art, which will not be repeated here.

Figure 5:
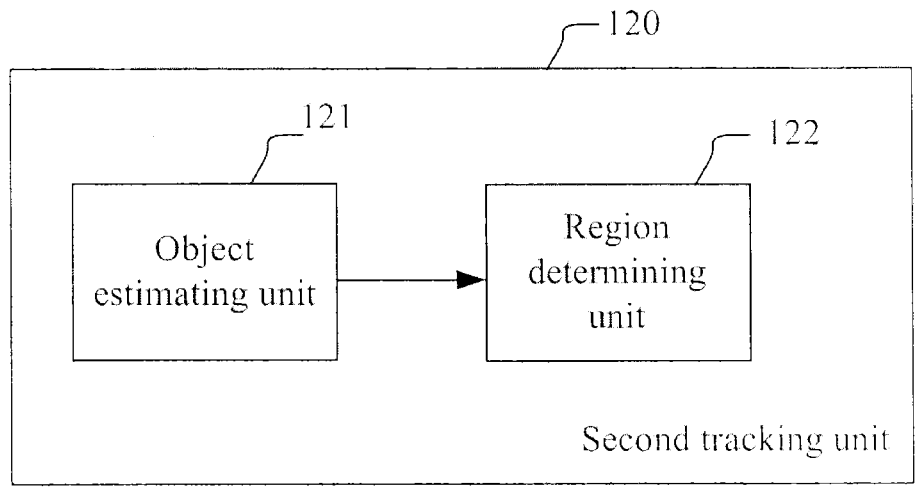
FIG. 5 shows a schematic block diagram of a second tracking unit according to an embodiment of the present invention.

FIG. 5 shows a schematic block diagram of the second tracking unit according to an embodiment of the present invention. As shown in FIG. 5, the second tracking unit 120 includes an object estimating unit 121 and a region determining unit 122. The exemplary work flow of the second tracking unit 120 will be described below in conjunction with FIG. 6. The work flow is also a specific implementation of step S220 in FIG. 2.

Figure 6:
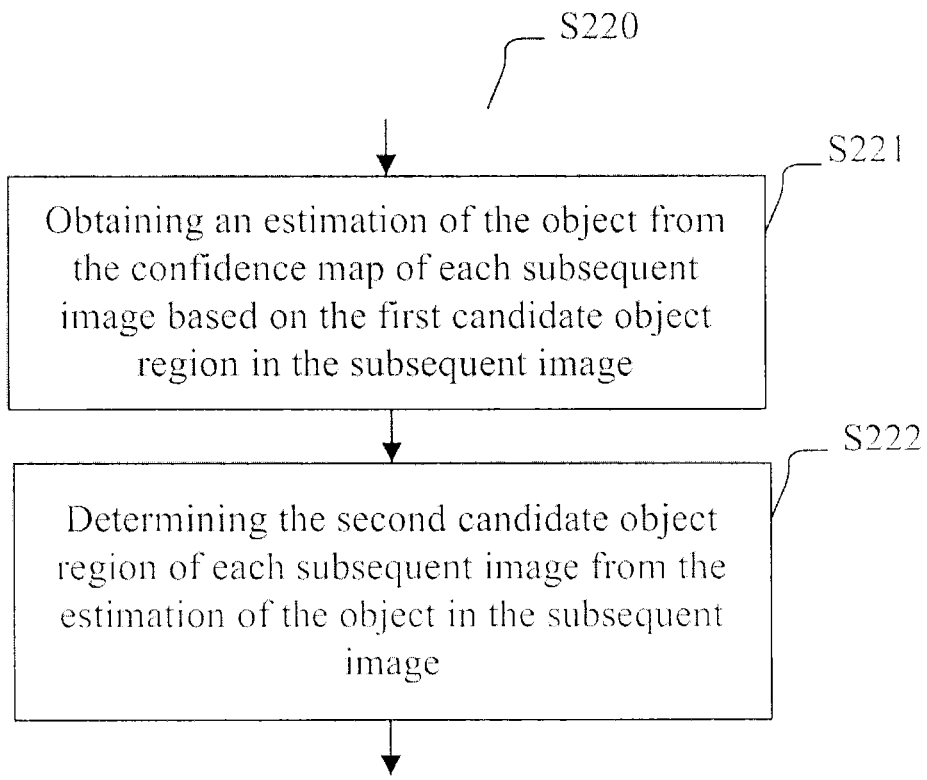
FIG. 6 shows a schematic work flowchart of the second tracking unit shown in FIG. 5.

As shown in FIG. 6, in step S221, an estimation of the object in each subsequent image is obtained from the confidence map of the subsequent image based on the first candidate object region of the subsequent image, in other words, it is determined which pixels in the subsequent image belong to the object. In step S222, the second candidate object region of each subsequent image is determined from the estimation of the object in the subsequent image. Herein, the step S221 can be executed by the object estimating unit 121, and the step S222 can be executed by the region determining unit 122.

As an example but not a limitation, the confidence map of each subsequent image used by the object estimating unit 121 can be the confidence map generated in the last iteration of the mean shift algorithm for the subsequent image by the first tracking unit 110. This can save calculation resources. Alternatively, the confidence map of each subsequent image used by the object estimating unit 121 can also be generated by the confidence map generating unit 140 according to the first candidate object region of the subsequent image.

The object estimating unit 121 can obtain the estimation of the object by using any suitable method known currently. As an example but not a limitation, the object estimating unit 121 can obtain the estimation of the object in each subsequent image from the confidence map of the subsequent image by using a Gaussian fitting method or a connected-domain analysis method.

In an example, the object estimating unit 121 obtains the estimation of the object in each subsequent image by using the Gaussian fitting method. Specifically, the object estimating unit 121 can calculate average values of the pixel values of all pixels of the subsequent image in the two coordinate axis directions (x axis and y axis) of the subsequent image, respectively, by using the confidence of each pixel of the subsequent image in the confidence map as a weight, which can be indicated by the following formulae 2 and 3; then calculate variances of the pixel values of all pixels of the subsequent image in the two coordinate axis directions according to the average value of the pixel values of all pixels on the respective coordinate axis directions, respectively, by using the confidence of each pixel of the subsequent image in the confidence map as a weight, which can be indicated by the following formulae 4 and 5; then calculate a covariance of the pixel values of all pixels of the subsequent image according to the average values and variances of the pixel values of all pixels in the respective coordinate axis directions, by using the confidence of each pixel of the subsequent image in the confidence map as a weight, which can be indicated by the following formula 6; and calculate the value of each pixel in a Gaussian fitting image of the subsequent image according to the average values, the variances and the covariance, which can be indicated by the following formula 7. In this example, for example, the region determining unit 122 can make a boundary rectangle or other predetermined boundary shape for the distribution region of the pixels whose pixel values are higher than a predetermined threshold in the Gaussian fitting image, and take the rectangle or the other predetermined shape as the second candidate object region in the subsequent image.

$$\mu_x = \frac{\sum_{all\_pixels}(x \cdot B_{x,y})}{\sum_{all\_pixels} B_{x,y}}, \quad \text{(formula 2)}$$

$$\mu_y = \frac{\sum_{all\_pixels}(y \cdot B_{x,y})}{\sum_{all\_pixels} B_{x,y}}, \quad \text{(formula 3)}$$

$$\sigma_x = \sqrt{\frac{\sum_{all\_pixels}[(x-\mu_x)^2 \cdot B_{x,y}]}{\sum_{all\_pixels} B_{x,y}}}, \quad \text{(formula 4)}$$

$$\sigma_y = \sqrt{\frac{\sum_{all\_pixels}[(y-\mu_y)^2 \cdot B_{x,y}]}{\sum_{all\_pixels} B_{x,y}}}, \quad \text{(formula 5)}$$

$$\rho_{xy}^2 = \frac{\sum_{all\_pixels}[(x-\mu_x)(y-\mu_y)B_{x,y}]}{\sigma_x \sigma_y \cdot \sum_{all\_pixels} B_{x,y}}, \quad \text{(formula 6)}$$

$$f(x,y) = \frac{1}{2\pi\sigma_x\sigma_y\sqrt{1-\rho_{xy}^2}} \exp\left[-\frac{1}{2(1-\rho_{xy}^2)}\left\{\frac{(x-\mu_x)^2}{\sigma_x^2} + \frac{(y-\mu_y)^2}{\sigma_y^2} - \frac{2\rho_{xy}^2(x-\mu_x)(y-\mu_y)}{\sigma_x\sigma_y}\right\}\right]. \quad \text{(formula 7)}$$

In the above formulae, $B_{x,y}$ indicates the confidence of a pixel (x, y) of the subsequent image in the confidence map of the subsequent image.

In another example, the object estimating unit 121 obtains an estimation of the object in each subsequent image by using a connected-domain analysis method. Specifically, the object estimating unit 121 can binarize the confidence map of each subsequent image according to a predetermined threshold so as to obtain one or more white connected domains in the binarized confidence map; and take the one or more white connected domains as the estimation of the object in the subsequent image. Preferably, the object estimating unit 121 can remove small and isolated white connected domains from the one or more white connected domains in the binarized confidence map, and take the residual white connected domains as the estimation of the object in the subsequent image so as to remove the affect of noises. In this example, for example, the region determining unit 122 can make a boundary rectangle or other predetermined boundary shape for the white connected domains being the estimation of the object, and take the rectangle or the other predetermined shape as the second candidate object region in the subsequent image.

Regarding more details of the Gaussian fitting method or the connected-domain analysis method, reference can be made to conventional art, which will not be described specifically here.

The object estimating unit 121 can also obtain the estimation of the object in each subsequent image from the confidence map of the subsequent image by using other fitting methods such as an ellipse fitting method, etc., which will not be detailed here.

The region determining unit 122 can determine the second candidate object region from the estimation of the object by using any suitable method. For example, the region determining unit 122 can make a boundary rectangle or other predetermined boundary shape with respect to the estimation of the object in each subsequent image, and take the rectangle or the other predetermined shape as the second candidate object region in the subsequent image.

Figure 7:
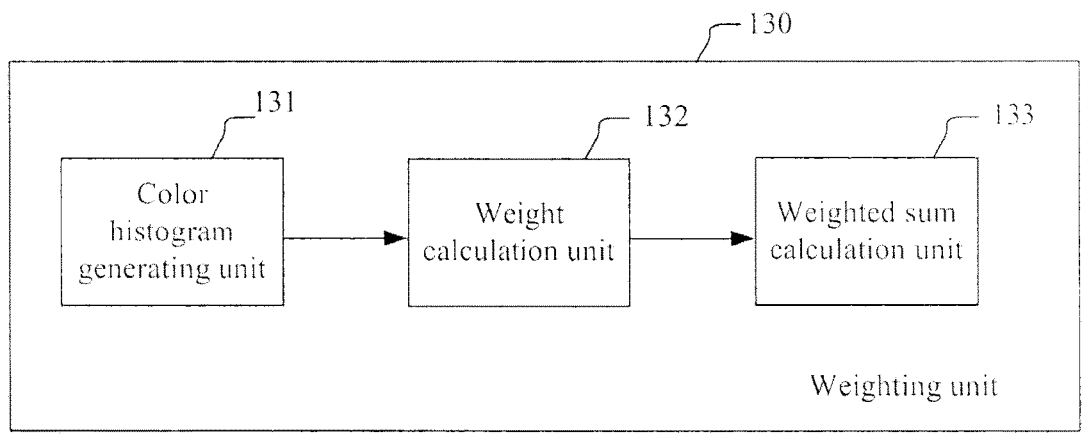
FIG. 7 shows a schematic block diagram of a weighting unit according to an embodiment of the present invention.

FIG. 7 shows a schematic block diagram of a weighting unit according to an embodiment of the present invention. As shown in FIG. 7, the weighting unit 130 includes a color histogram generating unit 131, a weight calculation unit 132 and a weighted sum calculation unit 133. A schematic work flowchart of the weighting unit 130 will be described below in conjunction with FIG. 8. The work flow in FIG. 8 is also an implementation of step S230 in FIG. 2.

Figure 8:
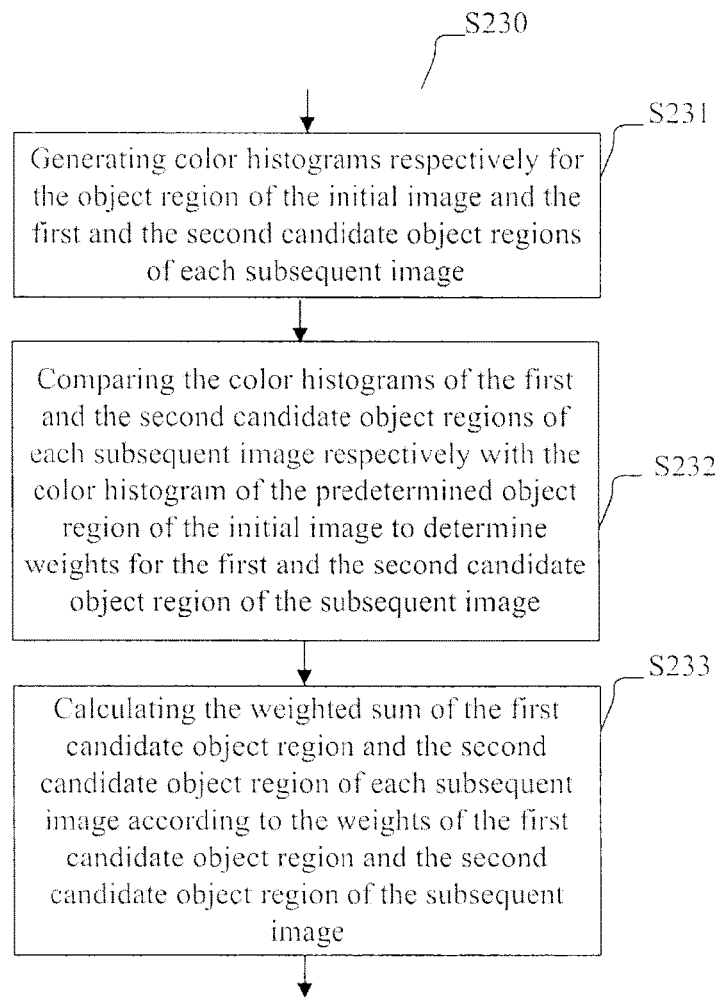
FIG. 8 shows a schematic work flowchart of the weighting unit shown in FIG. 7.

As shown in FIG. 8, in step S231, color histograms are generated respectively for the predetermined object region in the initial image and the first candidate object region and the second candidate object region of each subsequent image. In step S232, the color histograms of the first candidate object region and the second candidate object region of each subsequent image are respectively compared with the color histogram of the predetermined object region of the initial image of the image sequence so as to determine weights for the first candidate object region and the second candidate object region of the subsequent image. The smaller the difference from the color histogram of the predetermined object region of the initial image is, the larger the weight is. In step S233, the weighted sum of the first candidate object region and the second candidate object region of each subsequent image is calculated according to the weights of the first candidate object region and the second candidate object region of the subsequent image. Herein, the step S231 can be executed by the color histogram generating unit 131, the step S232 can be executed by the weight calculation unit 132, and the step S233 can be executed by the weighted sum calculation unit 133.

The weight calculation unit 132 can calculate, by using any suitable method, distances between the color histograms of the first and the second candidate object regions and the color histogram of the predetermined object region of the initial image of the image sequence, respectively, to determine the weights of the first candidate object region and the second candidate object region. For example, the weight calculation unit 132 can calculate Euclidean distances or Manhattan distances between the color histograms of the first and the second candidate object regions and the color histogram of the predetermined object region of the initial image of the image sequence, respectively. In an embodiment of the present invention, the weight calculation unit 132 calculates Bhattacharyya distances between the color histograms of the first and the second candidate object regions and the color histogram of the predetermined object region of the initial image, respectively, and takes the respective Bhattacharyya distances as the weights of the first candidate object region and the second candidate object region. The advantage of the Bhattacharyya distance lies in that the range thereof is between [0, 1], and the lower the difference between the color histograms is (indicating that the similarity between the images is higher), the higher the value of the Bhattacharyya distance is. Consequently the Bhattacharyya distance can be directly used as a weight.

The weighted sum calculation unit 133 can calculate a weighted sum of the first candidate object region and the second candidate object region in the subsequent image by using any suitable method. For example, the weighted sums of the lengths, the widths and the centers of the first candidate object region and the second candidate object region can be calculated respectively, and can be taken as new lengths, widths and centers to determine the object region of the subsequent image.

In addition, before calculating the weighted sum of the first candidate object region and the second candidate object region, the weights of the first candidate object region and the second candidate object region can be normalized to avoid too large difference in size between the generated object region and the actual object due to too large or too small values of the weights.

Though it is described above that the weighting unit 130 determines the weights of the first candidate object region and the second candidate object region by comparing the color histograms of the first candidate object region and the second candidate object region of the subsequent image with the color histogram of the predetermined object region of the initial image, this is only for illustration instead of limitation. The weighting unit 130 according to the embodiments of the present invention can obtain the weights of the first candidate object region and the second candidate object region in the subsequent image by using any suitable method. For example, predetermined weights can be directly used.

Figure 9:
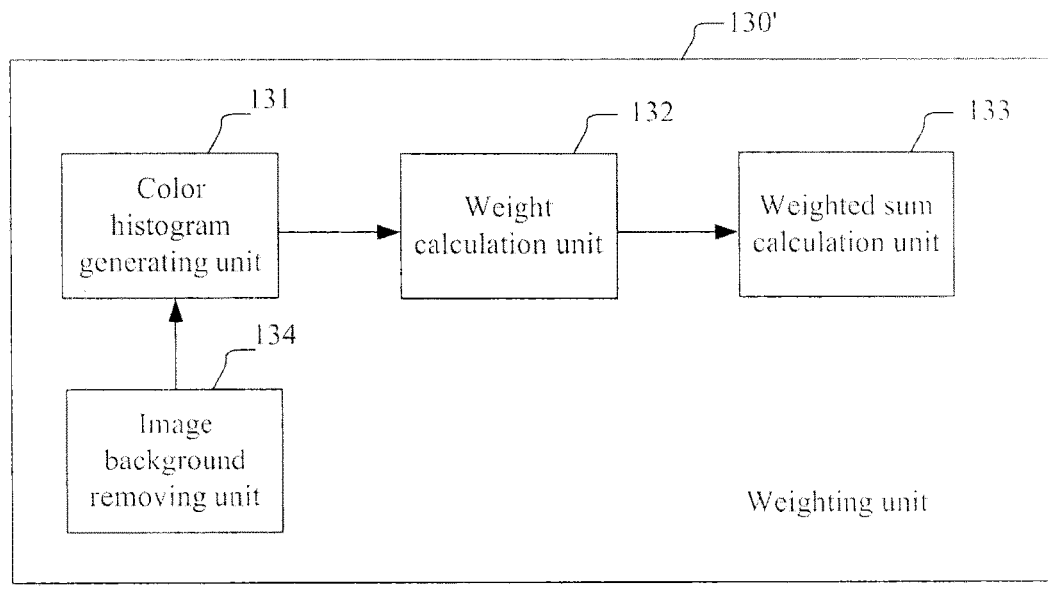
FIG. 9 shows a schematic block diagram of a weighting unit according to another embodiment of the present invention.

FIG. 9 shows a schematic block diagram of a weighting unit according to another embodiment of the present invention. In addition to the color histogram generating unit 131, the weight calculation unit 132 and the weighted sum calculation unit 133, the weighting unit 130' shown in FIG. 9 further includes a image background removing unit 134. The image background removing unit 134 is configured to set the values of the pixels in the initial image and each subsequent image which have a confidence lower than a second predetermined threshold to zero according to a confidence map of the initial image and the confidence map of the subsequent image respectively, so as to remove the background in the initial image and the subsequent image, respectively. Correspondingly, the color histogram generating unit 131 generates color histograms for the predetermined object region of the initial image wherein the background is removed, the first candidate object region of each subsequent image wherein the background is removed and the second candidate object region of each subsequent image wherein the background is removed, respectively. The functions of the weight calculation unit 132 and the weighted sum calculation unit 133 can be the same as those in the embodiment shown in FIG. 7. The pixels of the initial image and the subsequent images with a low confidence have a high probability of belonging to the background. By removing the pixels with a high probability of belonging to the background from the images before generating the color histograms, interference of the background to the subsequent weight calculation process can be mitigated to some extent.

Figure 10:
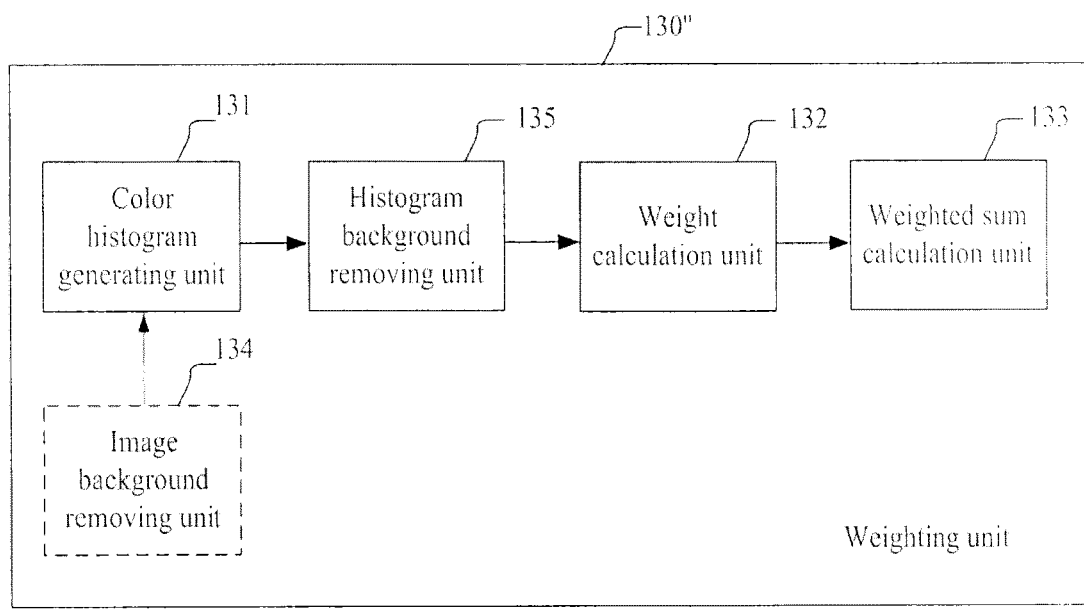
FIG. 10 shows a schematic block diagram of a weighting unit according to yet another embodiment of the present invention.

FIG. 10 shows a schematic block diagram of a weighting unit according to another embodiment of the present invention. In addition to the color histogram generating unit 131, the weight calculation unit 132, the weighted sum calculation unit 133 and the image background removing unit 134, the weighting unit 130" shown in FIG. 10 further includes a histogram background removing unit 135. The histogram background removing unit 135 is configured to remove, from the color histograms of the first candidate object region and the second candidate object region of each subsequent image, color bins which do not exist in the color histogram of the predetermined object region of the initial image, so as to remove background colors in the color histograms of the first and second candidate object regions with respect to the color histogram of the predetermined object region of the initial image. Accordingly, the weight calculation part 132 compares the color histograms of the first and the second candidate object regions of each subsequent image from which the background colors are removed respectively with the color histogram of the predetermined object region of the initial image to determine the weights of the first candidate object region and the second candidate object region of the subsequent image. The color bins which do not exist in the color histogram of the predetermined object region of the initial image have a high possibility of belonging to the background. By removing, from the color histograms of the first candidate object region and the second candidate object region of each subsequent image, the color bins which do not exist in the color histogram of the predetermined object region of the initial image, interference of the background to the subsequent weight calculation process can be mitigated to some extent.

The image background removing unit 134 in FIG. 10 is shown by a dotted line, indicating that the weighting unit 130" may include the image background removing unit 134, and may also not include the image background removing unit 134.

Figure 11:
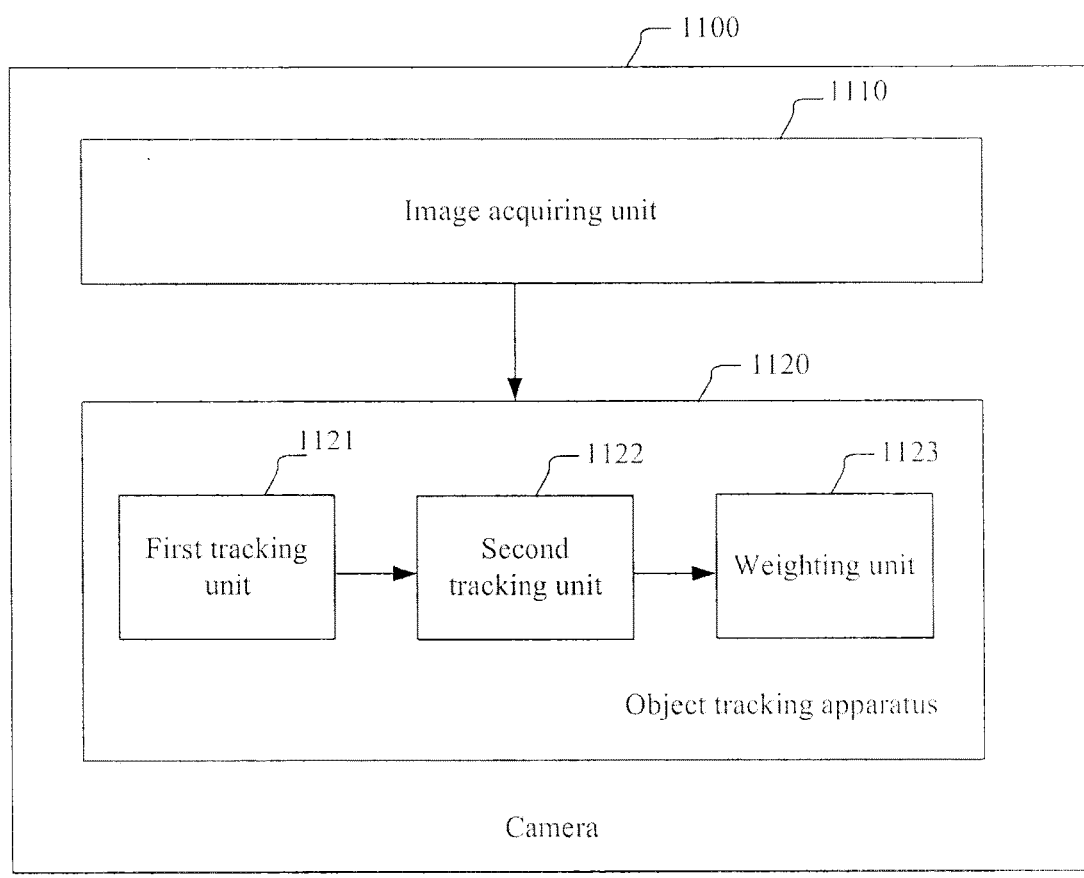
FIG. 11 shows a schematic block diagram of a camera according to an embodiment of the present invention.

The object tracking technique of the present invention can be applied to various scenarios that need object tracking. FIG. 11 shows a schematic block diagram of a camera to which the present invention is applied. For the purpose of conciseness, the figure only shows the portion closely related to the present invention. As shown in FIG. 11, a camera 1100 includes an image acquiring unit 1110 and an object tracking unit 1120. The image acquiring unit 1110 is configured to acquire an image sequence and determine an object region containing an object in an initial image of the image sequence. The object tracking unit 1120 is configured to determine an object region estimated to contain the object in subsequent images of the image sequence according to the object region of the initial image, and includes a first tracking unit 1121, a second tracking unit 1122 and a weighting unit 1123. The object tracking unit 1120 can be implemented by the object tracking unit 100 according to the embodiment of the present invention.

As an example but not a limitation, the image acquiring unit 1110 can receive image information which is input manually (for example, by outlining a region or pointing an object manually), and determine the object region of the initial image according to the image information input manually. Alternatively, the image acquiring unit 1110 can also identify automatically the object region in the initial image by using an existing suitable method. For example, the image acquiring unit 1110 recognizes automatically a predetermined region of the initial image as the object region of the initial image. This will not be detailed here so as not to obscure the present invention unnecessarily.

According to the object tracking apparatus and method and the camera of the above aspects of the present invention, an object region in each image can be obtained by determining in each image a first candidate object region whose size is fixed and a second candidate object region being adapted to the shape or size of the object in the image, and by calculating a weighted sum of the two candidate object regions. Thus, it is allowed to adapt the size of the object region obtained through tracking to the change in the shape or size of the object, and to avoid a big tracking error or even a risk of losing the object possibly caused in the case of solely using the second candidate object region adapted to the shape or size of the object in the image.

It should be understood that various components and units in the various apparatuses according to the embodiments of the present invention can be configured by way of software, firmware, hardware or a combination thereof. The specific approaches or ways used by the configuration are well known to those skilled in the art, and will not be described in detail herein. In the case of software or firmware implementation, programs constituting the software are installed to a computer with a dedicated hardware structure, and the computer can execute various functions when being installed with various programs.

Figure 12:
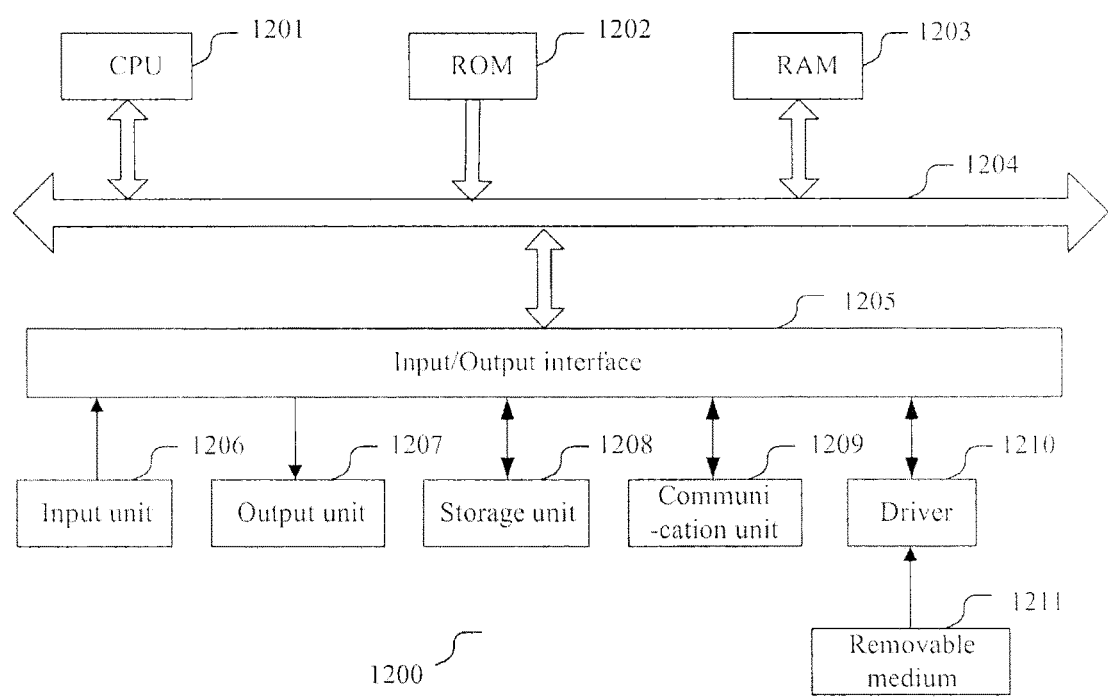
FIG. 12 shows an exemplary block diagram of the structure of a computer that can implement the embodiments/examples of the present invention.

FIG. 12 shows an exemplary block diagram of the structure of a computer that can implement the embodiments/examples of the present invention. In FIG. 12, a central processing unit (CPU) 1201 executes various processes according to programs stored in a read-only memory (ROM) 1202 or programs loaded to a random access memory (RAM) 1203 from a storage unit 1208. The RAM 1203 also, according to needs, stores data required when the CPU 1201 executes various processes. The CPU 1201, the ROM 1202 and the RAM 1203 are connected to each other via a bus 1204. An input/output interface 1205 is also connected to the bus 1204.

Such components as an input unit 1206 (including a keyboard, a mouse, etc.), an output unit 1207 (including a display such as a cathode ray tube (CRT), a liquid crystal display (LCD), a speaker, etc.), a storage unit 1208 (including a hard drive, etc.), a communication unit 1209 (including a network interface card such as an LAN card, a modem, etc.) are connected to the input/output interface 1205. The communication unit 1209 executes a communication process via a network such as the Internet. According to needs, a driver 1210 can also be connected to the input/output interface 1205. A removable medium 1211 such as a magnetic disk, an optical disc, a magneto optical disk, a semiconductor memory can be installed on the driver 1210 according to needs, so that the computer programs read out from the removable medium are loaded into the storing unit 1208 according to needs.

In the case that the above series of processes are implemented by way of software, programs constituting the software are loaded from a network such as the Internet or from a storage medium such as a removable medium 1211.

It should be understood by those skilled in the art that the storage medium is not limited to the removable storage medium 1211 as shown in FIG. 12 which stores programs and is distributed in a separated form with the equipment to provide a program to a user. The examples of the removable storage medium 1211 contain a magnetic disk (including a floppy disk (registered trademark)), an optical disc (including a compact disc read-only memory (CD-ROM) and a digital versatile disk (DVD)), a magneto-optical disk (including a mini disk (MD) (Registration trademarks) and a semiconductor memory. Alternatively, the storage medium may be the ROM 1102, or a hard disk contained in the storage unit 1108, etc. which have programs stored therein and are distributed to the user together with the equipment.

The present invention also provides a program product in which machine readable instruction codes are stored. The instruction codes, when being read and executed by the machine, can execute the object tracking method according to the embodiments of the present invention.

Correspondingly, a storage medium for carrying the above program product in which the machine-readable instruction codes are stored is also included in the disclosure of the present invention. The storage medium includes but not limited to a floppy disk, an optical disk, a magneto-optical disk, a memory card, a memory stick and etc.

In the above description for the embodiments of the present invention, features that are described and/or shown with respect to an implementation can be used in one or more other implementations in the same or similar manner, be combined with features in other implementations, or replace features in other implementations.

It should be emphasized that term "comprise/include" when being used in the present context refers to the existence of features, elements, steps or components, but does not exclude the existence or addition of one or more other features, elements, steps or components.

Moreover, the method of the present invention is not limited to being executed in a chronological order described in the specification, and can also be executed in another time sequence, in parallel or independently. Therefore, the execution order of the method described in the description does not construct a limitation to the technical scope of the present invention.

Though the embodiments of the present invention are detailed above in conjunction with the drawings, it should be understood that the above mentioned implementations are only provided for illustrating the present invention, but not for limiting the present invention. For those skilled in the art, various modifications and alternations can be made to the above implementations without departing from the essence and scope of the present invention. Therefore, the scope of the present invention is only defined by the appended claims and the equivalents thereof.

What is claimed is:

1. An object tracking apparatus for determining, according to a predetermined object region containing an object in an initial image of an image sequence, an object region estimated to contain the object in each subsequent image of the image sequence, a shape or a size of the object changing in the image sequence, comprising:
    a processor configured to:
        generate a confidence map for the each subsequent image according to the object region of a previous image of the subsequent image of the image sequence, a value of each pixel in the confidence map indicating a confidence with which a pixel in the subsequent image with a same position as a pixel in the confidence map belongs to the object;
        determine, using a first object tracking method, a first candidate object region of the each subsequent image in the confidence map of the subsequent image, a size of the first candidate object region being fixed for the each subsequent image;
        determine, using a second object tracking method different from the first object tracking method, a second candidate object region of the each subsequent image in the confidence map of the subsequent image based on the first candidate object region of a subsequent image, for the each subsequent image the second candidate object region being adapted to each shape or size of the object in the each subsequent image;
        generate color histograms respectively for the predetermined object region of the initial image, and the first candidate object region and the second candidate object region of the each subsequent image;
        compare the color histograms of the first and the second candidate object regions of the each subsequent image respectively with the color histogram of the predetermined object region of the initial image to determine each weight for the first candidate object region and the second candidate object region of the each subsequent image, wherein the smaller the difference from the color histogram of the predetermined object region of the initial image is, the larger the weight is; and
        calculate a weighted sum of lengths, widths, and centers of the first candidate object region and the second candidate object region of the each subsequent image respectively according to the each weight of the first candidate object region and the second candidate object region of the each subsequent image.

2. The object tracking apparatus according to claim 1, wherein
    the processor is further configured to use a mean shift algorithm to determine the first candidate object region of the each subsequent image in the confidence map of a subsequent map, and
    for the each subsequent image, in a first iteration of the mean shift algorithm, the processor is further configured to use the object region of the previous image of the subsequent image to generate the confidence map of the subsequent image for a present iteration, and in each subsequent iteration of the mean shift algorithm, the processor is configured to regenerate the confidence map of the subsequent image for the present iteration according to the first candidate object region determined by a previous iteration.

3. The object tracking apparatus according to claim 2, wherein for the each subsequent image, in each iteration of the mean shift algorithm, the processor is configured to calculate a barycenter of values of pixels which are in the confidence map for the present iteration and are located in the first candidate object region determined by the previous iteration, and update a location of the first candidate object region such that a center of the updated first candidate object region coincides with the barycenter.

4. The object tracking apparatus according to claim 1, wherein the processor is configured to determine the second candidate object region of the each subsequent image by using a fitting method or a connected-domain analysis method.

5. The object tracking apparatus according to claim 2, wherein the processor is configured to:
    obtain an estimation of the object in the each subsequent image from the confidence map of the subsequent image based on the first candidate object region of the subsequent image; and
    determine the second candidate object region of the each subsequent image from the estimation of the object in the subsequent image, the confidence map of the each subsequent image being the confidence map of the subsequent image for the last iteration of the mean shift algorithm.

6. The object tracking apparatus according to claim 1, wherein the processor is configured to:
obtain an estimation of the object in the each subsequent image from the confidence map of the subsequent image based on the first candidate object region of the subsequent image;
determine the second candidate object region of the subsequent image from the estimation of the object in the subsequent image; and
generate the confidence map of the each subsequent image to be used according to the first candidate object region of the subsequent image.

7. The object tracking apparatus according to claim 5, wherein the processor is configured to use a Gaussian fitting method or a connected-domain analysis method to obtain the estimation of the object in the each subsequent image from the confidence map of the subsequent image.

8. The object tracking apparatus according to claim 1, wherein the confidence map of the each subsequent image is a color confidence map of the subsequent image in which a value of each pixel is a ratio of a distribution probability of a color at a position of this pixel in the subsequent image in the object region of the subsequent image to the distribution probability of the color in the subsequent image, the object region of the previous image of the subsequent image in the image sequence being taken as the object region of the subsequent image.

9. The object tracking apparatus according to claim 8, wherein the value of each pixel in the color confidence map of the subsequent image is a ratio of the distribution probability of a color bin that the color at the position of this pixel in the subsequent image belongs to in the object region of the subsequent image to the distribution probability of the color bin that the color belongs to in the subsequent image.

10. The object tracking apparatus according to claim 8, wherein the processor is configured to extract pixels in the subsequent image of which ratios of the distribution probabilities of the colors are higher than a first predetermined threshold to form the color confidence map of the subsequent image.

11. The object tracking apparatus of claim 1, wherein the processor is configured to:
set values of pixels in the initial image and the each subsequent image which have a confidence lower than a second predetermined threshold to zero according to a confidence map of the initial image and the confidence map of the subsequent image respectively, so as to remove a background in the initial image and the subsequent image respectively; and
generate the confidence map for the initial image in which value of each pixel indicates the confidence with which a pixel in the initial image with a same position as this pixel belongs to the object.

12. An object tracking method for determining, according to a predetermined object region containing an object in an initial image of an image sequence, an object region estimated to contain the object n each subsequent image of the image sequence, a shape or a size of the object changing in the image sequence, the object tracking method comprising:
generating a confidence map for the each subsequent image according to the object region of a previous image of the subsequent image of the image sequence, a value of each pixel in the confide indicating a confidence with which a pixel in the subsequent image with a same position as a pixel in the confidence map belongs to the object;
determining, using a first object tracking method, a first candidate object region of the each subsequent image in the confidence map of the subsequent image, a size of the first candidate object region being fixed for the each subsequent image;
determining, using a second object tracking method different from the first object tracking method, a second candidate object region of the each subsequent image in the confidence map of the subsequent image based on the first candidate object region of a subsequent image, for the each subsequent image the second candidate object region being adapted to each shape or size of the object in the each subsequent image;
generating color histograms respectively for the predetermined object region of the initial image, and the first candidate object region and the second candidate object region of the each subsequent image,
comparing the color histograms of the first and the second candidate object regions of the each subsequent image respectively with the color histogram of the predetermined object region of the initial image to determine each weight for the first candidate object region and the second candidate object region of the each subsequent image, wherein the smaller the difference from the color histogram of the predetermined object region of the initial image is, the larger the weight is; and
calculating, using a processor, a weighted sum of lengths, widths, and centers of the first candidate object region and the second candidate object region of the each subsequent image respectively according to the each weight of the first candidate object region and the second candidate object region of the each subsequent image.

13. The object tracking method according to claim 12, further comprising:
using a mean shift algorithm to determine the first candidate object region of the each subsequent image in the confidence map of the subsequent map,
wherein for the each subsequent image, in a first iteration of the mean shift algorithm, the object region of a previous image of the subsequent image is used to generate the confidence map of the subsequent image for a present iteration, and in each subsequent iteration of the mean shift algorithm, the confidence map of the subsequent image for the present iteration is regenerated according to the first candidate object region determined by a previous iteration.

14. The object tracking method according to claim 13, further comprising:
obtaining an estimation of the object from the confidence map of the each subsequent image based on the first candidate object region of the subsequent image; and
determining the second candidate object region of the each subsequent image from the estimation of the object in the subsequent image,
wherein the confidence map of the each subsequent image used in obtaining the estimation of the object is the confidence map of the subsequent image for a last iteration of the mean shift algorithm.

15. A camera comprising:
a processor configured to:
acquire an image sequence and determine an object region containing an object in an initial image of the image sequence;

determine an object region estimated to contain the object in each subsequent image of the image sequence according to the object region of the initial image, a shape or a size of the object changing in the image sequence;

generate a confidence map for the each subsequent image according to the object region of a previous image of the subsequent image of the image sequence, a value of each pixel in the confidence map indicating a confidence with which a pixel in the subsequent image with a same position as a pixel in the confidence map belongs to the object;

determine, using a first object tracking method, a first candidate object region of the each subsequent image in the confidence map of the subsequent image, a size of the first candidate object region being fixed for the each subsequent image;

determine, using a second object tracking method different from the first object tracking method, a second candidate object region f the each subsequent image in the confidence map of the subsequent image based on the first candidate object region of a subsequent image, for the each subsequent image the second candidate object region being adapted to each shape or size of the object in the each subsequent image;

generate color histograms respectively for the predetermined object region of the initial image, and the first candidate object region and the second candidate object region of the each subsequent image;

compare the color histograms of the first and the second candidate object regions of the each subsequent image respectively with the color histogram of the predetermined object region of the initial image to determine each weight for the first candidate object region and the second candidate object region of the each subsequent image, wherein the smaller the difference from the color histogram of the predetermined object region of the initial image is, the larger the weight is; and calculate a weighted sum of lengths, widths, and centers of the first candidate object region and the second candidate object region of the each subsequent image respectively according to the each weight of the first candidate object region and the second candidate object region of the each subsequent image.

16. A non-transitory storage medium including machine readable program codes which when being executed on an information processing machine, allow the information processing machine to perform a method for determining, according to a predetermined object region containing an object in an initial image of an image sequence, an object region estimated to contain the object in each subsequent image of the image sequence, a shade or a size of the object changing in the image sequence, the method comprising:

generating a confidence map for the each subsequent image according to the object region of a previous image of the subsequent image of the image sequence, a value of each pixel in the confidence map indicating a confidence with which a pixel in the subsequent image with a same position as a pixel in the confidence map belongs to the object;

determining, using a first object tracking method, a first candidate object region of the each subsequent image in the confidence map of the subsequent image, a size of the first candidate object region being fixed for the each subsequent image;

determining, using a second object tracking method different from the first object tracking method, a second candidate object region of the each subsequent image in the confidence map of the subsequent image based on the first candidate object region of a subsequent image, for the each subsequent image the second candidate object region being adapted to each shape or size of the object in the each subsequent image;

generating color histograms respectively for the predetermined object region of the initial image, and the first candidate object region and the second candidate object region of the each subsequent image;

comparing the color histograms of the first and the second candidate object regions of the each subsequent image respectively with the color histogram of the predetermined object region of the initial image to determine each weight for the first candidate object region and the second candidate object region of the each subsequent image, wherein the smaller the difference from the color histogram of the predetermined object region of the initial image is, the larger the weight is; and calculating a weighted sum of lengths, widths, and centers of the first candidate object region and the second candidate object region of the each subsequent image respectively according to the each weight of the first candidate object region and the second candidate object region of the each subsequent image.

\* \* \* \* \*